US008631178B2

(12) United States Patent
Deng et al.

(10) Patent No.: US 8,631,178 B2
(45) Date of Patent: Jan. 14, 2014

(54) SYSTEM BUS MONITORING METHOD, SYSTEM BUS MONITOR, AND SYSTEM ON CHIP

(75) Inventors: Li Deng, Shanghai (CN); Yu Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 13/023,832

(22) Filed: Feb. 9, 2011

(65) Prior Publication Data

US 2011/0197002 A1 Aug. 11, 2011

(30) Foreign Application Priority Data

Feb. 9, 2010 (CN) .......................... 2010 1 0107545

(51) Int. Cl.
*G06F 13/00* (2006.01)
(52) U.S. Cl.
USPC ......................................... 710/110; 710/109
(58) Field of Classification Search
USPC ................................................. 710/110, 109
See application file for complete search history.

(56) References Cited

U.S. PATENT DOCUMENTS

| | | | | |
|---|---|---|---|---|
| 5,444,855 A | * | 8/1995 | Thompson ..................... | 710/107 |
| 5,982,781 A | * | 11/1999 | Przybyla et al. ............. | 370/462 |
| 6,470,430 B1 | * | 10/2002 | Fischer et al. ................ | 711/153 |
| 6,857,029 B2 | * | 2/2005 | Ganasan et al. ................ | 710/15 |
| 7,225,286 B2 | * | 5/2007 | Bennett ......................... | 710/305 |
| 7,406,531 B2 | * | 7/2008 | Fuehrer et al. ................ | 709/232 |
| 7,539,809 B2 | * | 5/2009 | Juenger ......................... | 710/307 |
| 2002/0077783 A1 | | 6/2002 | Awadalla | |
| 2006/0010307 A1 | * | 1/2006 | Williams ...................... | 712/227 |
| 2009/0254310 A1 | * | 10/2009 | Kanzaki et al. ............... | 702/186 |

FOREIGN PATENT DOCUMENTS

CN 101156148 A 4/2008

OTHER PUBLICATIONS

1st Office Action in corresponding Chinese Application No. 201010107545.4 (Mar. 24, 2011).
Li et al., "Design and Implementation of Linux I2C Bus Driver," Computer Engineering and Design, Jan. 2005, vol. 26, No. 1, China Academic Journal Electronic Publishing House, Beijing, China.

* cited by examiner

*Primary Examiner* — Paul R Myers
*Assistant Examiner* — Christopher A Daley
(74) *Attorney, Agent, or Firm* — Leydig, Voit & Mayer, Ltd.

(57) ABSTRACT

In the field of system bus technology, a system bus monitoring method, a system bus monitor, and a System On Chip (SOC) are provided, so as to more accurately monitor an average transmission efficiency of a system bus. The system bus monitoring method includes: accepting a pre-configured monitoring time; monitoring a system bus in real time during the monitoring time to determine an effective transmission time of the system bus; and determining a ratio of the effective transmission time to the monitoring time as an average transmission efficiency of the system bus. The present invention is applicable in monitoring of the performance of the system bus.

14 Claims, 8 Drawing Sheets

SYSTEM BUS MONITORING METHOD, SYSTEM BUS MONITOR, AND SYSTEM ON CHIP

CROSS-REFERENCE TO RELATED APPLICATION

This application claims priority to Chinese Patent Application No. 201010107545.4, filed on Feb. 9, 2010, which is hereby incorporated by reference in its entirety.

FIELD OF THE INVENTION

The present invention relates to the field of system bus technology, and in particular, to a system bus monitoring method, a system bus monitor, and a System On Chip (SOC).

BACKGROUND OF THE INVENTION

System On Chip (SOC) means a technology for integrating a complete system on a single chip, and packaging all or a part of necessary electronic circuits. Due to its high effective integration performance, the SOC has become a main solution in place of an integrated circuit (IC), and become an inevitable trend in the development of a microelectronic chip at present.

The SOC technology is generally applied in a miniature and complicated electronic device. For example, an SOC in a sound detection device is a system provided on a single chip and including electronic elements, such as an audio receiver, an analog-to-digital converter (ADC), a microprocessor, a necessary memory, and an input/output logic controller. In a specific application scenario, some of these electronic elements may initiate a command request as a master device, and some may respond to the command request as a slave device. Moreover, a system bus may be disposed between the master devices and the slave devices to transmit data.

In a practical application, monitoring of the transmission efficiency of a system bus is very important. For example, as for an image display apparatus, the transmission efficiency of a system bus may directly influence the display effect of an image, and the higher the transmission efficiency of the system bus is, the better the display effect of the image will be.

At present, in monitoring of the transmission efficiency of a system bus, simulation methods with Electronic Design Automation (EDA) and Electrical System Level (ESL) are mainly used.

In the implementation of the above simulation process, the inventors found that the prior art at least has the following problem.

Influenced by, for example, accuracy of a simulation model and completeness of a simulation scenario, accurate monitoring of the transmission efficiency of a system bus cannot be ensured.

SUMMARY OF THE INVENTION

The present invention is directed to a system bus monitoring method, a system bus monitor, and an SOC, so as to more accurately monitor an average transmission efficiency of a system bus.

In order to achieve the above objectives, the present invention provides the following technical solutions.

A system bus monitoring method is provided, which includes:

accepting a pre-configured monitoring time;

monitoring a system bus in real time during the monitoring time to determine an effective transmission time of the system bus; and determining a ratio of the effective transmission time to the monitoring time as an average transmission efficiency of the system bus.

A system bus monitor is provided, which includes:

an accepting unit, adapted to accept a pre-configured monitoring time;

a monitoring unit, adapted to monitor a system bus in real time during the monitoring time, and determine an effective transmission time of the system bus; and a determining unit, adapted to determine a ratio of the effective transmission time to the monitoring time as an average transmission efficiency of the system bus.

An SOC is provided, which includes at least one master device and at least one slave device. A system bus is connected between the master device and the slave device, and is connected with a system bus monitor thereon. The system bus monitor is adapted to accept a pre-configured monitoring time, monitor the system bus in real time during the monitoring time, determine an effective transmission time of the system bus, and determine a ratio of the effective transmission time to the monitoring time as an average transmission efficiency of the system bus.

According to the system bus monitoring method, the system bus monitor, and the SOC of the present invention, the system bus can be directly monitored in real time during the pre-configured monitoring time, to determine the effective transmission time of the system bus, and determine the average transmission efficiency of the system bus according to the effective transmission time and the monitoring time, such that the average transmission efficiency of the system bus can be more accurately monitored, as compared with the simulation of the system bus using a simulation model.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Hereinafter, the system bus monitoring method, the system bus monitor, and the SOC of the present invention will be described in detail with reference to the accompanying drawings.

It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
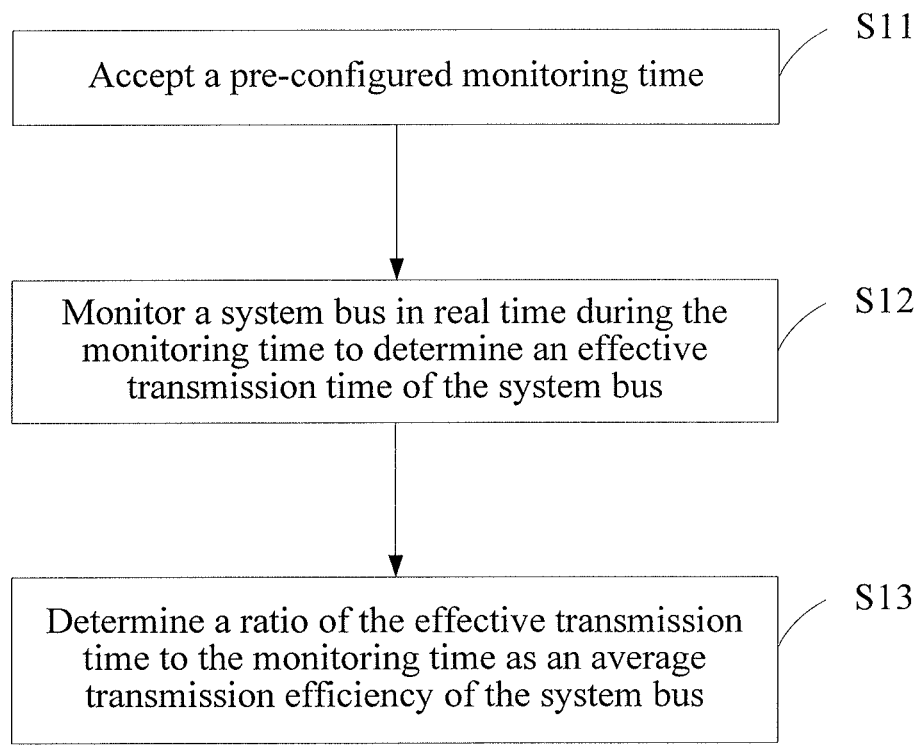
FIG. 1 is a schematic view of a method for monitoring an average transmission efficiency of a system bus according to an embodiment of the present invention.

As shown in FIG. 1, a system bus monitoring method according to an embodiment of the present invention includes the following steps.

In Step S11, a pre-configured monitoring time is accepted.

In Step S12, a system bus is monitored in real time during the monitoring time, to determine an effective transmission time of the system bus.

In Step S13, an average transmission efficiency of the system bus is determined according to the effective transmission time and the monitoring time, that is, a ratio of the effective transmission time to the monitoring time is determined as the average transmission efficiency of the system bus.

According to the system bus monitoring method in this embodiment, the system bus can be directly monitored in real time during the pre-configured monitoring time, to determine the effective transmission time of the system bus, and determine the average transmission efficiency of the system bus according to the effective transmission time and the monitoring time, such that the average transmission efficiency of the system bus can be more accurately monitored, as compared with the simulation of the system bus using a simulation model.

A main body implementing the system bus monitoring method may be a monitor specially disposed to monitor the performance of the system bus. It should be noted that the performance of the system bus in this embodiment includes, but is not limited to, the average transmission efficiency, data traffic, or transmission type.

Figure 2:
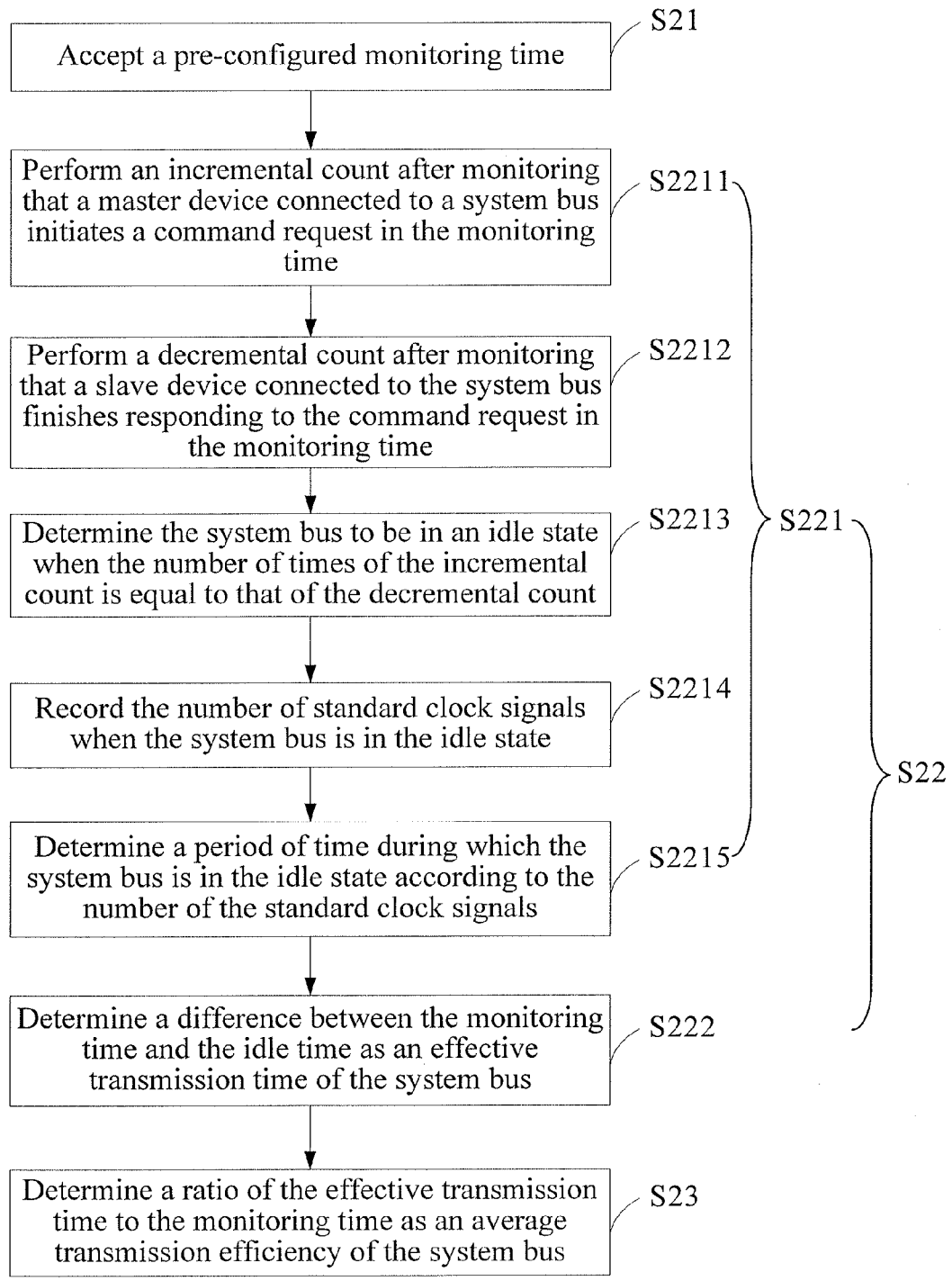
FIG. 2 is a detailed schematic view of the method for monitoring the average transmission efficiency of the system bus as shown in FIG. 1.

Hereinafter, the system bus monitoring technology is described with an Advanced eXtensible Interface (AXI) bus as an example, and a technical solution similar to that in this embodiment may also be applied in other system buses. Specifically, in the embodiment as shown in FIG. 2, the monitoring of an average transmission efficiency of a system bus in a monitoring time mainly includes the following steps.

In Step S21, a pre-configured monitoring time is accepted.

In Step S22, an effective transmission time of the system bus is determined.

The effective transmission time may be determined by various methods. For example, a counter is adapted to directly record a period of time during which the system bus is in a working state, and the recorded time is the effective transmission time.

In this embodiment, a method for determining the effective transmission time of the system bus includes the following steps.

In Step S221, an idle time of the system bus is monitored.

In Step S222, a difference between the monitoring time and the idle time is determined as the effective transmission time of the system bus. That is, the effective transmission time of the system bus may be determined by the following formula:

$$\text{Effective transmission time} = \text{Monitoring time} - \text{idle time}$$

In this embodiment, the monitoring the idle time of the system bus in Step S221 specifically includes: determining that the system bus is in an idle state, and then recording a period of time during which the system bus is in the idle state, in which the recorded time is the idle time.

A method for determining that the system bus is in the idle state includes the following steps.

In Step S2211, after monitoring that a master device connected to the system bus initiates a command request, an incremental count is performed, that is, a counter is increased by 1.

In Step S2212, after monitoring that a slave device connected to the system bus finishes responding to the command request, a decremental count is performed, that is, the counter is decreased by 1.

Figure 3:
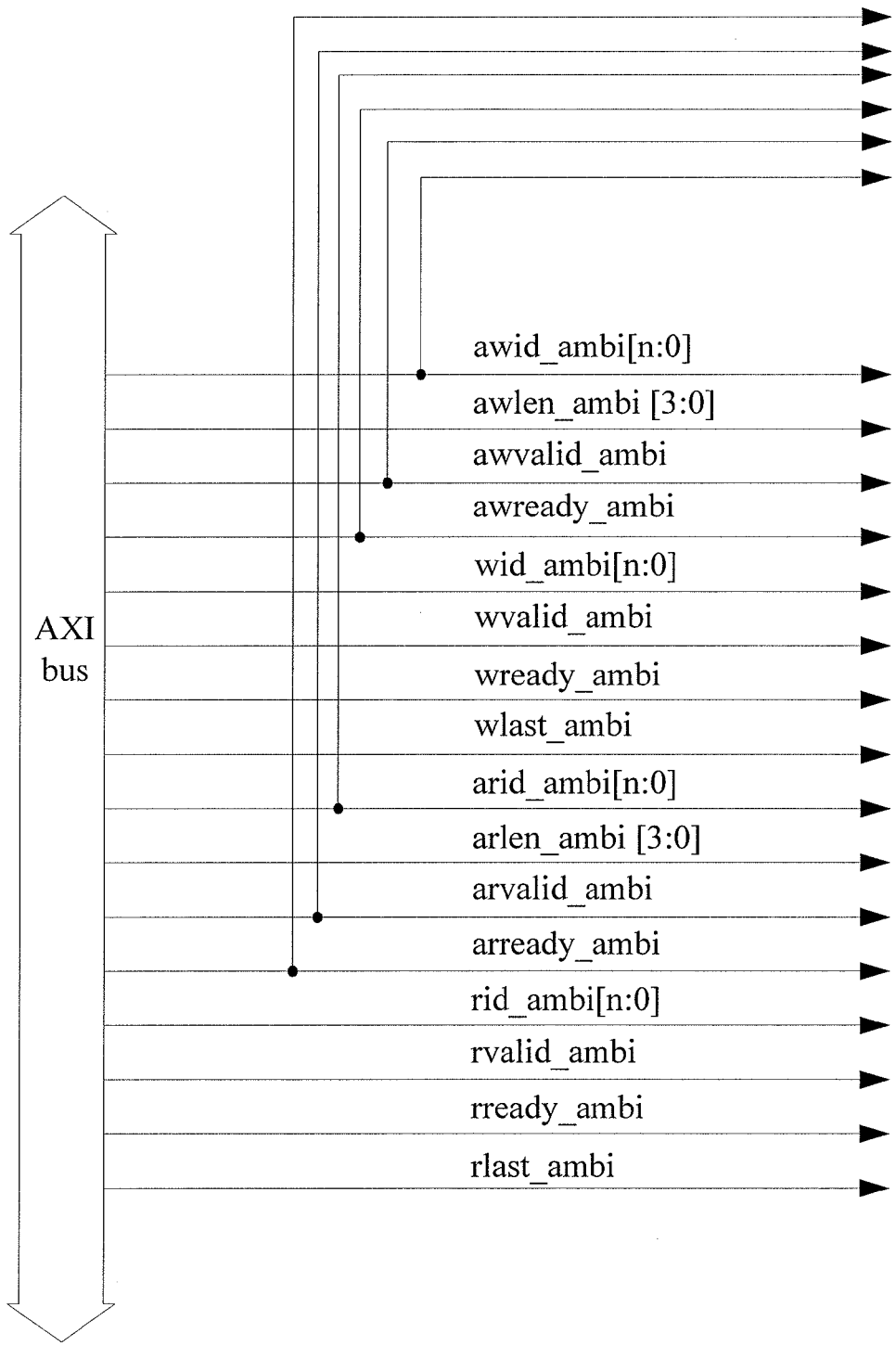
FIG. 3 is a schematic view of a transmission command request of a system bus according to an embodiment of the present invention.

In a practical application, there may be a case in which a master device initiates a command request, and a slave device is required to respond several times, for example, the master device initiates a command request to require the slave device to return eight numerical values by eight times. In this case, the command request is considered to be completed only after the slave device performs the last response. Specifically, as shown in FIG. 3, in the AXI bus, only when wlast_ambi, awvalid_ambi, and aready_ambi are all high, the slave device is determined to finish responding to a write request. Likewise, when rlast_ambi, arvalid_ambi, and arready_ambi are all high, the slave device is determined to finish responding to a read request.

In Step S2213, when the number of times of the incremental count is equal to that of the decremental count, the system bus is determined to be in the idle state; otherwise, the system bus is determined to be in the working state.

It should be noted that in this embodiment, if the master device initiates two command requests at the same time, for example, the master device initiates a read request and a write request at the same time, the counter is increased by 2. Likewise, if the slave device responds to two command requests at the same time, for example, the slave device responds to a read request and a write request at the same time, the counter is decreased by 2.

A method for recording the period of time during which the system bus is in the idle state includes the following steps.

In Step S2214, the number of standard clock signals is recorded when the system bus is in the idle state, and a frequency of the standard clock signal can be determined according to actual demands.

In Step S2215, a period of time during which the system bus is in the idle state is determined according to the number of the standard clock signals. After the frequency of the standard clock signal is determined, a period of the standard clock signal may be determined, and as a result, the period of time during which the system bus is in the idle state can be determined according to the recorded number of the standard clock signals and the period of the standard clock signal.

In Step S23, a ratio of the effective transmission time to the monitoring time is determined as an average transmission efficiency of the system bus. That is, the average transmission efficiency of the system bus may be determined by the following formula:

$$\text{Average transmission efficiency} = \text{Effective transmission time} / \text{Monitoring time}$$

In the formula, the monitoring time may be configured according to the practical application scenario.

In this embodiment, the command request includes a read request and a write request. Specifically, as shown in FIG. 3, in the AXI bus, when awvalid_ambi and awready_ambi are both high, the master device is determined to initiate a write request; and when arvalid_ambi and arready_ambi are both high, the master device is determined to initiate a read request.

Figure 4:
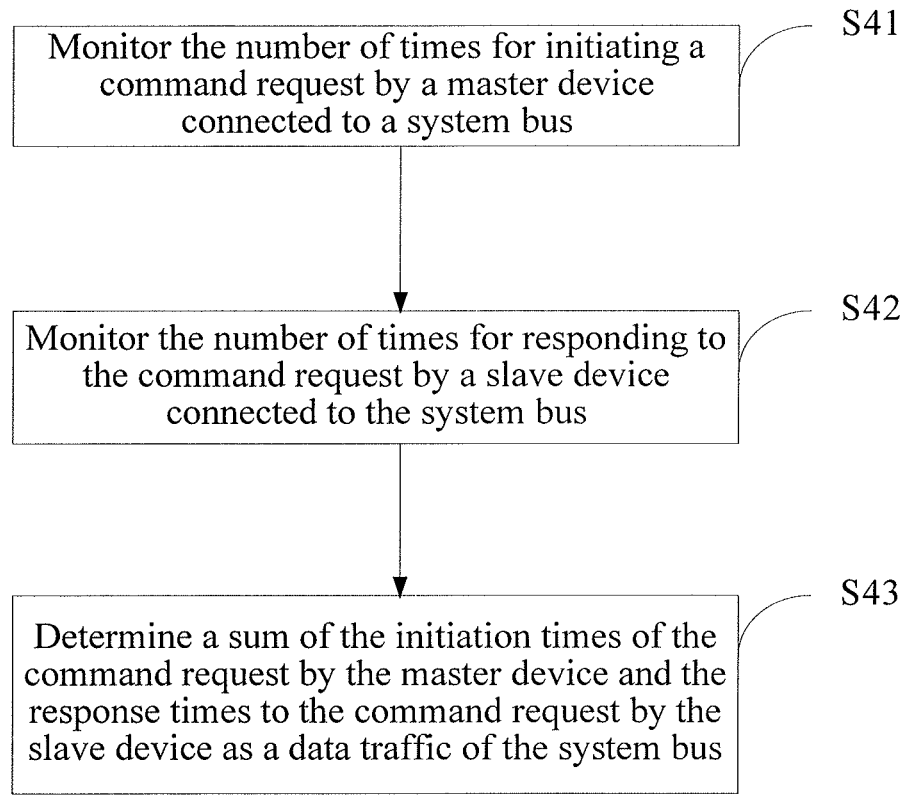
FIG. 4 is a schematic view of a method for monitoring data traffic of a system bus according to an embodiment of the present invention.

As shown in FIG. 4, in an embodiment, the present invention further provides a method for monitoring data traffic of a system bus in real time during a monitoring time, which includes the following steps.

In Step S41, the number of times for initiating a command request by a master device connected to the system bus is monitored.

Specifically, the command request includes a read request and a write request. Referring to FIG. 3 again, in an AXI bus, the monitoring of awvalid_ambi and awready_ambi may record the number of times for initiating the write request by the master device, and the monitoring of arvalid_ambi and arready_ambi may record the number of times for initiating the read request by the master device.

In Step S42, the number of times for responding to the command request by a slave device connected to the system bus is monitored.

The monitoring of wready_ambi and wvalid_ambi may record the number of times for responding to the write request by the slave device, and the monitoring of rready_ambi and rvalid_ambi may record to the number of times for responding to the read request by the slave device.

In Step S43, a sum of the number of times for initiating the command request by the master device and the number of times for responding to the command request by the slave device is determined as the data traffic of the system bus.

It should be noted that in a practical application of this embodiment, the number of times for initiating the command request by the master device can be omitted, as it is rather small as compared with the number of times for responding to the command request by the slave device. Therefore, in monitoring the data traffic of the system bus in the monitoring time, it is possible to only record the number of times for responding to the command request initiated by the master device by the slave device.

In addition, the present invention may also make statistics on the data traffic for different command IDs. Taking an AXI bus for example, as the AXI bus supports an outstanding transmission mode, when the master device initiates a command request by using a command ID1 and the slave device has not responded to the command request, the master device may further initiate a next command request by using a command ID2. In this manner, the AXI bus may transmit command requests carrying a plurality of command IDs at the same time.

Therefore, when it is required to monitor the data traffic of the system bus for a specific command ID, statistics can be made on read and write times initiated by the master device for a specific command ID through awid_ambi and arid_ambi, that is, in the above method of making statistics on the data traffic, the command requests carry an uniform command ID.

In the above embodiment, though the methods for monitoring the average transmission efficiency and the data traffic of the system bus in real time during the monitoring time are specifically described, the present invention is not limited thereto. In other embodiments of the present invention, other performances of the system bus may be further monitored in real time during the monitoring time according to actual demands.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

In an embodiment, the present invention further provides a system bus monitor, which is adapted to accept a pre-configured monitoring time, and monitor a performance of a system bus in real time during the monitoring time.

In this embodiment, the system bus monitor can directly monitor the performance of the system bus in real time during the pre-configured monitoring time, such that the system performance can be more accurately monitored, as compared with the simulation of the performance of the system bus using a simulation model.

Figure 5:
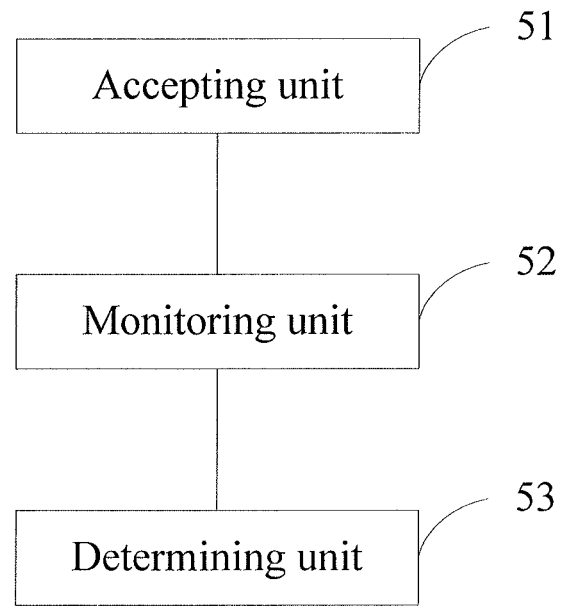
FIG. 5 is a schematic view of a frame structure of a system bus monitor according to an embodiment of the present invention.

In an embodiment as shown in FIG. 5, to monitor the average transmission efficiency of the system bus in real time during the monitoring time, the system bus monitor includes an accepting unit 51, a monitoring unit 52, and a determining unit 53.

The accepting unit 51 is adapted to accept the pre-configured monitoring time.

The monitoring unit 52 is adapted to monitor the system bus in real time during the monitoring time, and determine an effective transmission time of the system bus.

The determining unit 53 is adapted to determine an average transmission efficiency of the system bus according to the effective transmission time and the monitoring time, that is, determine a ratio of the effective transmission time to the monitoring time as the average transmission efficiency of the system bus.

In this embodiment, the system bus monitor can directly monitor the system bus in real time during the pre-configured monitoring time, determine the effective transmission time of the system bus, and determine the average transmission efficiency of the system bus according to the effective transmission time and the monitoring time, such that the average transmission efficiency of the system bus can be more accurately monitored, as compared with the simulation of the system bus using a simulation model.

The monitoring unit 52 may determine the effective transmission time of the system bus through a direct method. That is, the monitoring unit 52 may record a period of time during which the system bus is in a working state directly by using a counter, and the recorded time is the effective transmission time.

Alternatively, the monitoring unit 52 may determine the effective transmission time of the system bus through an indirect method. That is, the effective transmission time of the system bus is indirectly obtained by determining an idle time of the system bus. In this case, as shown in FIG. 6, the monitoring unit 52 includes a monitoring module 521 and a determining module 522.

The monitoring module 521 is adapted to monitor the idle time of the system bus.

The determining module 522 is adapted to determine a difference between the monitoring time and the idle time as the effective transmission time of the system bus.

Figure 6:
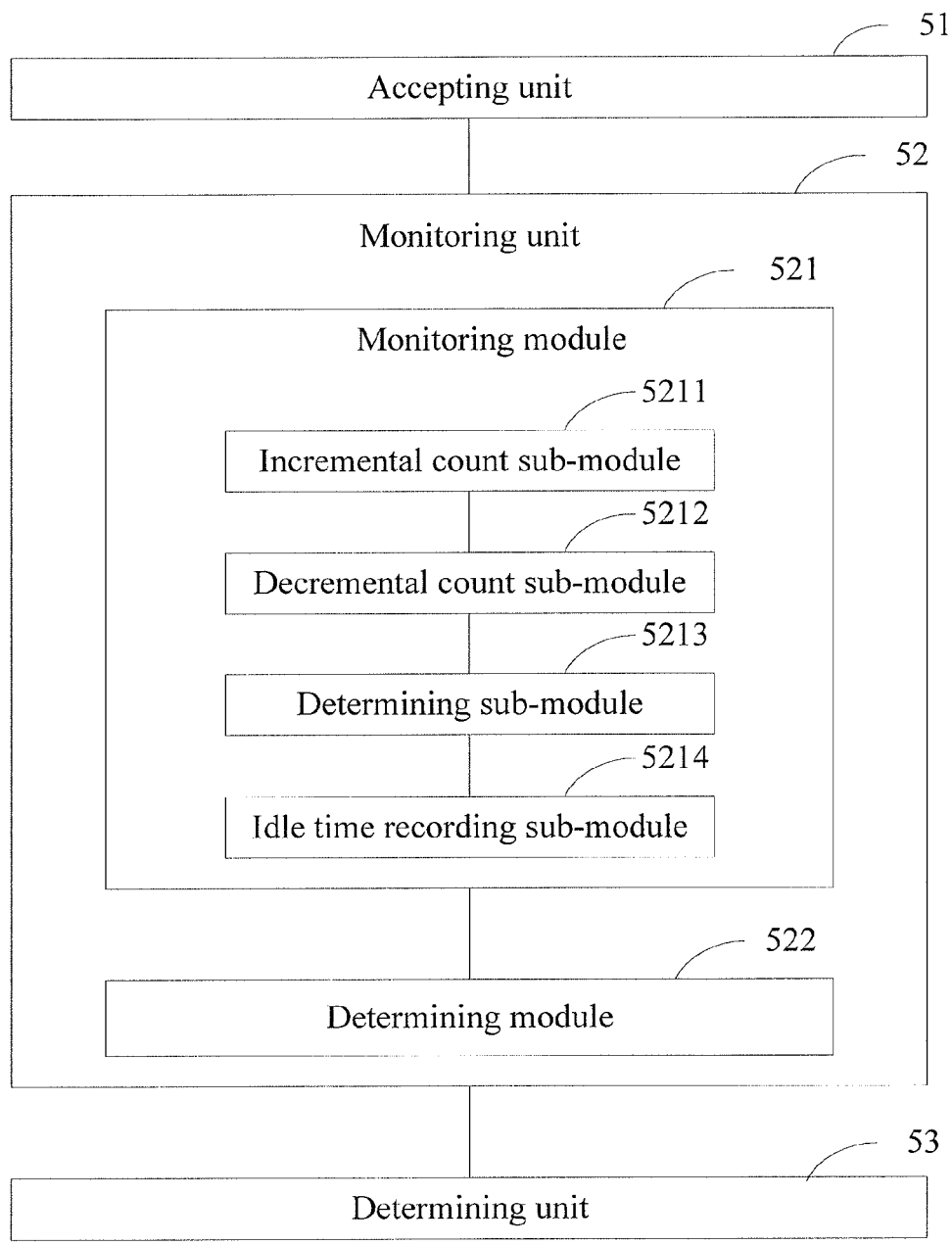
FIG. 6 is a detailed schematic view of the system bus monitor as shown in FIG. 5.

It can be known from FIG. 6 that the monitoring module 521 in this embodiment includes an incremental count sub-module 5211, a decremental count sub-module 5212, a determining sub-module 5213, and an idle time recording sub-module 5214.

The incremental count sub-module 5211 is adapted to perform an incremental count after monitoring that a master device connected to the system bus initiates a command request.

The decremental count sub-module 5212 is adapted to perform a decremental count after monitoring that a slave device connected to the system bus finishes responding to the command request.

The determining sub-module 5213 is adapted to determine the system bus to be in the idle state when the number of times of the incremental count is equal to that of the decremental count.

The idle time recording sub-module 5214 is adapted to record a period of time during which the system bus is in the idle state.

The idle time recording sub-module 5214 includes a counter and a statistical device.

The counter is adapted to record the number of standard clock signals when the system bus is in the idle state.

The statistical device is adapted to determine the period of time during which the system bus is in the idle state according to the number of the standard clock signals.

Similar to the above method embodiments, in this embodiment, the command request includes a read request and a write request.

Figure 7:
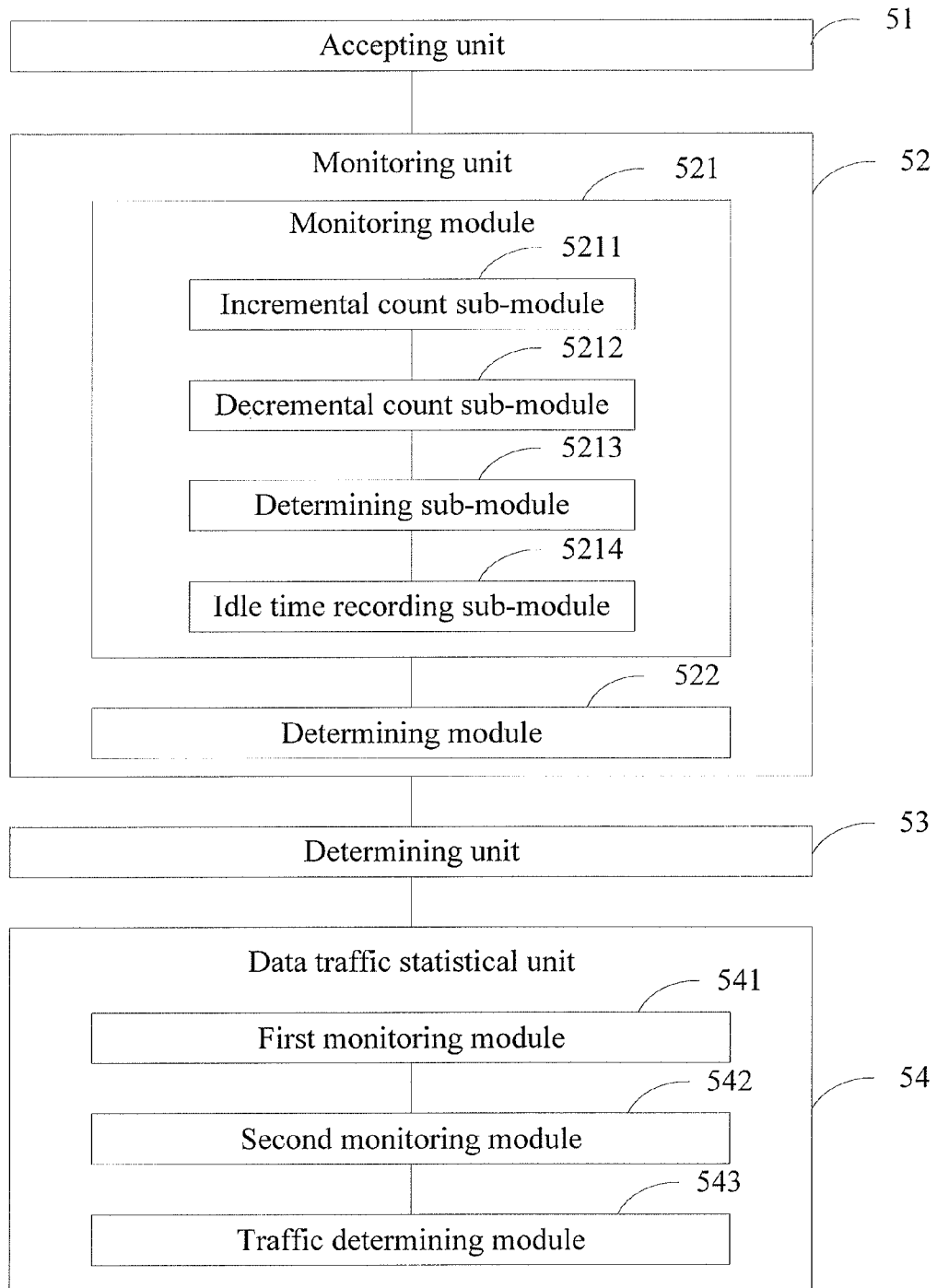
FIG. 7 is a schematic view of the system bus monitor as shown in FIG. 5 after modification.

As shown in FIG. 7, to monitor the data traffic of the system bus in real time during the monitoring time, the system bus monitor further includes a data traffic statistical unit 54.

The data traffic statistical unit 54 is adapted to monitor the data traffic of the system bus in real time during the monitoring time.

Specifically, it can be known from FIG. 7 that the data traffic statistical unit 54 further includes a first monitoring module 541, a second monitoring module 542, and a traffic determining module 543.

The first monitoring module 541 is adapted to monitor the number of times for initiating a command request by a master device connected to the system bus.

The second monitoring module 542 is adapted to monitor the number of times for responding to the command request by a slave device connected to the system bus.

The traffic determining module 543 is adapted to determine a sum of the number of times for initiating the command request by the master device and the number of times for responding to the command request by the slave device as the data traffic of the system bus.

Figure 10:
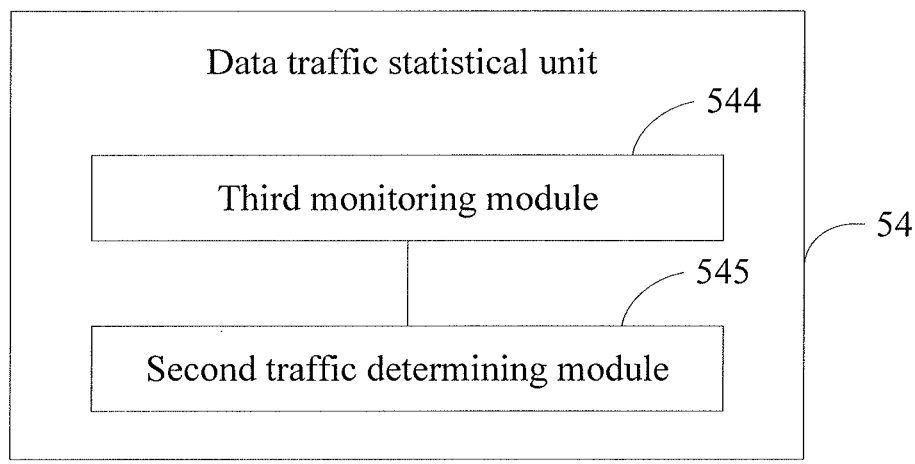
FIG. 10 is a schematic structural view of a data traffic statistical unit according to an embodiment of the present invention.

In an embodiment, as shown in FIG. 10, the data traffic statistical unit 54 further includes a third monitoring module 544 and a second traffic determining module 545.

The third monitoring module 544 is adapted to monitor the number of times for responding, by the slave device connected to the system bus, to the command request initiated by the master device connected to the system bus.

The second traffic determining module 545 is adapted to determine the times monitored by the third monitoring module 544 as the data traffic of the system bus.

Similar to the above method embodiments, in this embodiment, the data traffic statistical unit 54 may the data traffic for different command IDs. Taking an AXI bus for example, as the AXI bus supports an outstanding transmission mode, when the master device initiates a command request by using a command ID1 and the slave device has not responded to the command request, the master device may further initiate a next command request by using a command ID2. In this manner, the AXI bus may transmit command requests carrying a plurality of command IDs at the same time.

Figure 8:
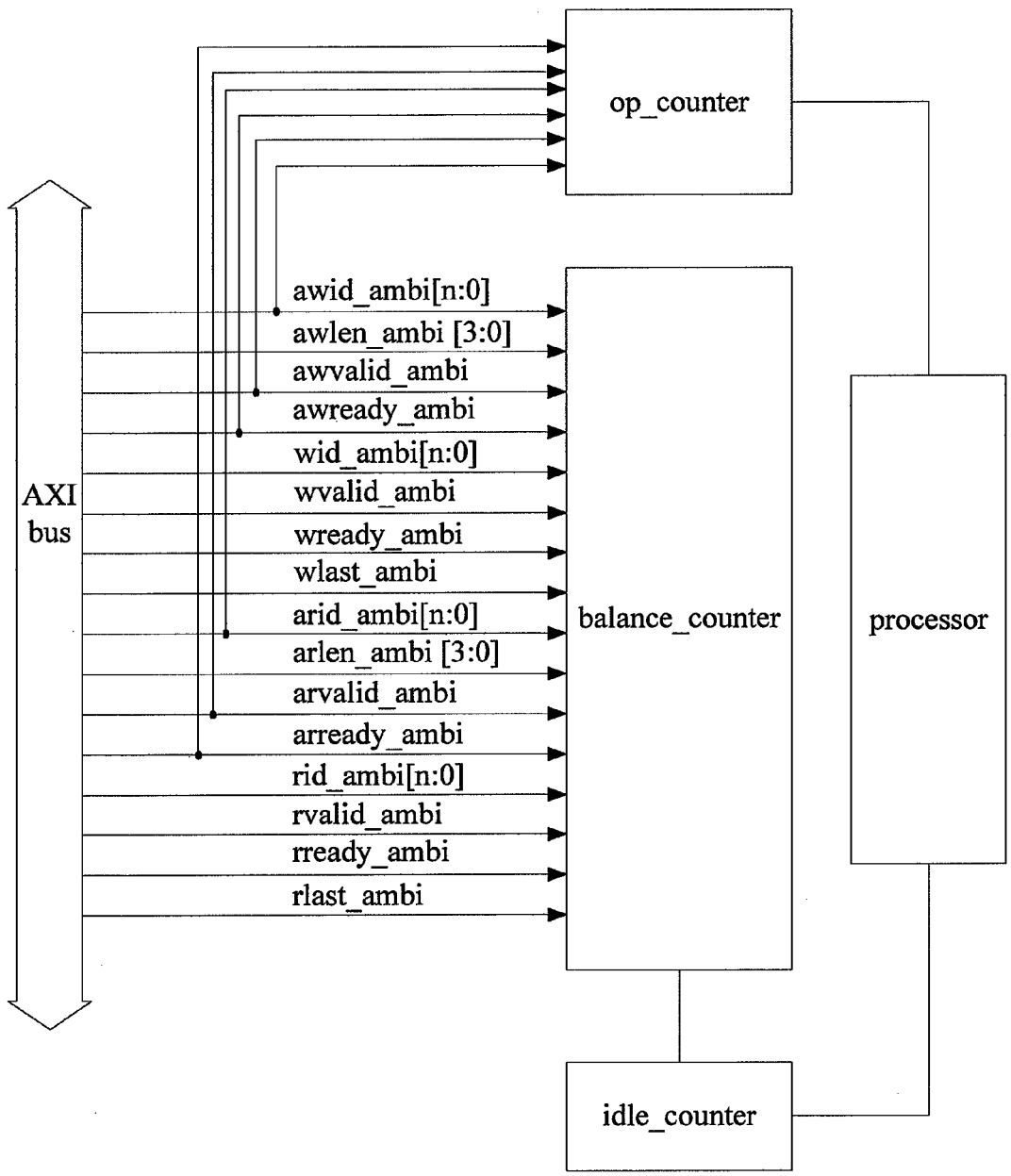
FIG. 8 is a schematic structural view of a specific system bus monitor according to an embodiment of the present invention.

Specifically, as shown in FIG. 8, in this embodiment, the system bus monitor includes a system bus balance_counter, an op_counter, a system bus idle_counter, and a processor.

In order to monitor an average transmission efficiency of a system bus in real time during a monitoring time, the balance_counter is increased by 1 when a master device initiates a command request, and is decreased by 1 when a slave device finishes responding to the command request. When a value of the balance_counter is 0, it is indicated that the system bus is in an idle state; otherwise, the system bus is in a working state.

When the balance_counter monitors that the system bus is in the idle state, the idle_counter is triggered to start counting standard clock signals. When a frequency of the standard clock signal is determined, the idle_counter can record a period of time during which the system bus is in the idle state by counting the standard clock signals.

Then, the idle_counter transmits the recorded idle time to the processor, and the processor determines the average transmission efficiency of the system bus according to the idle time and the pre-stored monitoring time.

In order to monitor data traffic of the system bus in real time during the monitoring time, the op_counter makes statistics on the number of times for initiating a command request by the master device, and the number of times for responding to the command request by the slave device. The specific statistical method is the same as that described in the above method embodiments. In the monitoring time, when completing the statistics, the op_counter sends a statistical result to the processor, and the processor determines the data traffic of the system bus according to the statistical result.

Specifically, in the embodiment as shown in FIG. 7, the monitoring unit may include a system bus balance_counter and a system bus idle_counter; the determining unit may be a processor; and the data traffic statistical unit may include an op_counter and a processor.

Figure 9:
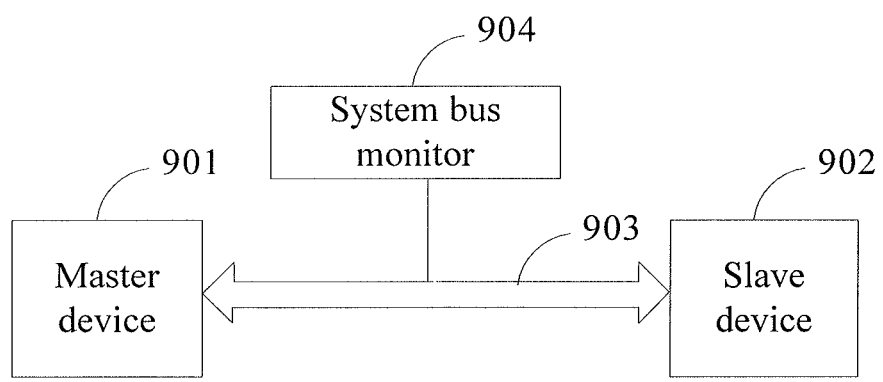
FIG. 9 is a schematic structural view of an SOC according to an embodiment of the present invention.

As shown in FIG. 9, in an embodiment, the present invention provides an SOC, which includes at least one master device 901 and at least one slave device 902. A system bus 903 is connected between the master device 901 and the slave device 902, and is connected with a system bus monitor 904 thereon. The system bus monitor 904 is adapted to accept a pre-configured monitoring time, monitor a performance of the system bus in real time during the monitoring time, determine an effective transmission time of the system bus, and determine a ratio of the effective transmission time to the monitoring time as an average transmission efficiency of the system bus.

In an embodiment, the system bus monitor 904 is further adapted to monitor data traffic of the system bus in real time during the monitoring time.

It should be noted that the structure and functions of the system bus monitor in this embodiment are the same as those of the system bus monitor in the above embodiment, and the details may not be described herein again.

In view of the above, according to the system bus monitoring method, the system bus monitor, and the SOC of the present invention, the system bus can be directly monitored in real time during the pre-configured monitoring time, to determine the effective transmission time of the system bus, and determine the average transmission efficiency of the system bus according to the effective transmission time and the monitoring time, such that the average transmission efficiency of the system bus can be more accurately monitored, as compared with the simulation of the system bus using a simulation model.

In conclusion, the above are merely preferred embodiments of the present invention. However, the scope of the present invention is not limited thereto. Changes or replacements readily apparent to persons skilled in the art within the technical scope of the present invention shall fall within the scope of the present invention. Therefore, the protection scope of the present invention is subject to the appended claims.

The invention claimed is:

1. A system bus monitoring method, comprising:
accepting a pre-configured monitoring time;
monitoring a system bus in real time during the pre-configured monitoring time,
monitoring an idle time of the system bus, and determining a difference between the pre-configured monitoring time and the idle time as an effective transmission time of the system bus; and
determining a ratio of the effective transmission time to the pre-configured monitoring time as an average transmission efficiency of the system bus;
wherein, the monitoring the idle time of the system bus comprises:
performing an incremental count after monitoring that a master device connected to the system bus initiates a command request;
performing a decremental count after monitoring that a slave device connected to the system bus finishes responding to the command request;
determining the system bus to be in an idle state, when a number of times of the incremental count is equal to a number of times of a decremental count; and
recording a period of time during which the system bus is in the idle state as the idle time of the system bus.

2. The system bus monitoring method according to claim 1, wherein the recording the period of time during which the system bus is in the idle state comprises:
recording a number of standard clock signals when the system bus is in the idle state; and
determining the period of time during which the system bus is in the idle state according to the number of the standard clock signals.

3. The system bus monitoring method according to claim 1, wherein the command request comprises a read request and a write request.

4. The system bus monitoring method according to claim 1, further comprising:
monitoring data traffic of the system bus in real time during the monitoring time.

5. The system bus monitoring method according to claim 4, wherein the monitoring the data traffic of the system bus in real time during the monitoring time comprises:
monitoring a number of times for initiating the command request by the master device connected to the system bus;
monitoring a number of times for responding to the command request by the slave device connected to the system bus; and
determining a sum of the number of times for initiating the command request by the master device and the number of times for responding to the command request by the slave device as the data traffic of the system bus.

6. The system bus monitoring method according to claim 4, wherein the monitoring the data traffic of the system bus in real time during the monitoring time comprises:
monitoring a number of times for responding, by the slave device connected to the system bus, to the command request initiated by the master device connected to the system bus; and
determining a number of times for responding to the command request as the data traffic of the system bus.

7. The system bus monitoring method according to claim 6, wherein the command request carries a uniform command ID.

8. A system bus monitor, comprising:
an accepting unit, configured to accept a pre-configured monitoring time;
a monitoring unit, configured to monitor a system bus in real time during the pre-configured monitoring time, and determine an effective transmission time of the system bus; and
a determining unit, configured to determine a ratio of the effective transmission time to the pre-configured monitoring time as an average transmission efficiency of the system bus;
wherein, the monitoring unit comprises: a monitoring module, configured to monitor an idle time of the system bus; and a determining module, configured to determine a difference between the pre-configured monitoring time and the idle time as the effective transmission time of the system bus;
wherein, the monitoring module comprises:
an incremental count sub-module that performs an incremental count after monitoring that a master device connected to the system bus initiates a command request;
a decremental count sub-module that performs a decremental count after monitoring that a slave device connected to the system bus finishes responding to the command request;
a determining sub-module that determines the system bus to be in an idle state when the number of times of the incremental count is equal to that of the decremental count; and
an idle time recording sub-module that records a period of time during which the system bus is in the idle state.

9. The system bus monitor according to claim 8, wherein the idle time recording sub-module comprises:
a counter that records a number of standard clock signals when the system bus is in the idle state; and
a statistical device that determines a period of time during which the system bus is in the idle state according to the number of the standard clock signals.

10. The system bus monitor according to claim 8, wherein the system bus monitor further comprises:
a data traffic statistical unit that monitors data traffic of the system bus in real time during the monitoring time.

11. The system bus monitor according to claim 10, wherein the data traffic statistical unit comprises:
a first monitoring module that monitors a number of times for initiating the command request by the master device connected to the system bus;
a second monitoring module that monitors a number of times for responding to the command request by the slave device connected to the system bus; and
a first traffic determining module that determines a sum of the number of times for initiating the command request by the master device and the number of times for responding to the command request by the slave device as the data traffic of the system bus.

12. The system bus monitor according to claim 10, wherein the data traffic statistical unit comprises:
 a third monitoring module that monitors a number of times for responding, by the slave device connected to the system bus, to the command request initiated by the master device connected to the system bus; and
 a second traffic determining module that determines times monitored by the third monitoring module as the data traffic of the system bus.

13. A System On Chip (SOC), comprising at least one master device and at least one slave device, wherein a system bus is connected between the master device and the slave device, and is connected with a system bus monitor thereon; and the system bus monitor is configured to accept a pre-configured monitoring time, monitor the system bus in real time during the pre-configured monitoring time, perform an incremental count after monitoring that a master device connected to the system bus initiates a command request, perform a decremental count after monitoring that a slave device connected to the system bus finishes responding to the command request, determine the system bus to be in an idle state, when a number of times of the incremental count is equal to a number of times of the decremental count, record a period of time during which the system bus is in the idle state as the idle time of the system bus, and determine a difference between the pre-configured monitoring time and the idle time as an effective transmission time of the system bus, and determine a ratio of the effective transmission time to the pre-configured monitoring time as an average transmission efficiency of the system bus.

14. The SOC according to claim 13, wherein the system bus monitor is further configured to monitor data traffic of the system bus in real time during the monitoring time.

* * * * *